United States Patent
Harvey et al.

(10) Patent No.: US 11,057,755 B1
(45) Date of Patent: Jul. 6, 2021

(54) CRISIS MANAGEMENT SYSTEM

(71) Applicant: United Services Automobile Association (USAA), San Antonio, TX (US)

(72) Inventors: Cynthia Harvey, Boerne, TX (US); Lisa Marie Carr, San Antonio, TX (US); Stefanie Acosta, San Antonio, TX (US); Raul F. Martinez, Jr., San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 182 days.

(21) Appl. No.: 15/616,652

(22) Filed: Jun. 7, 2017

Related U.S. Application Data

(60) Provisional application No. 62/346,928, filed on Jun. 7, 2016.

(51) Int. Cl.
| | |
|---|---|
| *H04L 5/04* | (2006.01) |
| *H04L 12/58* | (2006.01) |
| *H04W 4/12* | (2009.01) |
| *H04W 4/90* | (2018.01) |
| *H04L 29/08* | (2006.01) |
| *H04L 29/06* | (2006.01) |

(52) U.S. Cl.
CPC ............. *H04W 4/90* (2018.02); *H04L 51/04* (2013.01); *H04L 65/1069* (2013.01); *H04L 65/403* (2013.01); *H04L 67/26* (2013.01); *H04W 4/12* (2013.01)

(58) Field of Classification Search
CPC .................................................. G05B 19/0423
USPC ........................................................ 709/206
See application file for complete search history.

(56) References Cited

U.S. PATENT DOCUMENTS

| | | | |
|---|---|---|---|
| 9,820,120 B2* | 11/2017 | deCharms | H04W 4/021 |
| 9,986,404 B2* | 5/2018 | Mehta | H04W 4/029 |
| 10,115,283 B1* | 10/2018 | Sokolov | G08B 21/0453 |
| 2003/0125998 A1 | 7/2003 | McKenney et al. | |
| 2004/0064436 A1 | 4/2004 | Breslin et al. | |
| 2006/0217126 A1* | 9/2006 | Sohm | H04L 69/329 |
| | | | 455/454 |
| 2008/0189162 A1* | 8/2008 | Ganong | G06F 17/3089 |
| | | | 705/7.13 |
| 2008/0208605 A1* | 8/2008 | Sinha | G06Q 10/10 |
| | | | 705/1.1 |
| 2014/0045446 A1* | 2/2014 | Assuncao | H04M 3/5116 |
| | | | 455/404.1 |
| 2015/0271655 A1* | 9/2015 | Jatavallabhula | H04W 4/90 |
| | | | 455/404.1 |

(Continued)

*Primary Examiner* — Moustafa M Meky
*Assistant Examiner* — Sm Z Islam
(74) *Attorney, Agent, or Firm* — Fish & Richardson P.C.

(57) ABSTRACT

Methods, systems, and apparatus, including computer programs encoded on computer storage media, for crisis communications. One of the methods includes establishing a secure connection between a crisis communications management system and a device. The method includes receiving, over the secure connection, a status update about a crisis situation. The method includes identifying a plurality of devices associated with team members assigned to the crisis. The method also includes pushing the status update to each of the plurality of mobile devices.

18 Claims, 11 Drawing Sheets

(56) References Cited

U.S. PATENT DOCUMENTS

2016/0337830 A1* 11/2016 Moss ..................... H04W 4/90
2018/0176362 A1* 6/2018 Cohen ................. G08B 25/009

* cited by examiner

CRISIS MANAGEMENT SYSTEM

CROSS-REFERENCE TO RELATED APPLICATION

This application claims priority to U.S. Application Ser. No. 62/346,928, filed on Jun. 7, 2016, the entire contents of which is incorporated by reference into the present disclosure.

BACKGROUND

Crisis management is the process by which an organization deals with a major event that threatens to harm the organization, its stakeholders, or the general public. In contrast to risk management, which involves assessing potential threats and finding the best ways to avoid those threats, crisis management involves dealing with threats before, during, and after they have occurred. Crisis management includes response to a spectrum of severity levels, ranging from small scale issues and medium scale incidents, to large scale crises. For the purposes of this document, the word crisis will be used to cover the entire spectrum. A critical element of crisis management is crisis communications.

SUMMARY

This specification describes technologies relating to digital communication and crisis management.

In general, one innovative aspect of the subject matter described in this specification can be embodied in methods that include the actions of establishing a secure connection between a crisis communications management system and a device, enabling a continuous experience across multiple platforms. The method includes the actions of receiving, over the secure connection, a status update about a crisis situation. The method includes the actions of identifying a plurality of devices associated with team members assigned to the crisis response. The method includes the actions of pushing the status update to each of the plurality of devices.

Other embodiments of this aspect include corresponding computer systems, apparatus, and computer programs recorded on one or more computer storage devices, each configured to perform the actions of the methods. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

The foregoing and other embodiments can each optionally include one or more of the following features, alone or in combination. The methods may include the actions of establishing a chat session between each of the plurality of devices. The methods may include the actions of receiving news about the crisis situation from a news aggregation system, and forwarding the news to each of the plurality of devices. The news aggregation system may aggregate news from sources internal to the organization and sources external to the organization. The system may enable communication between team members and may include at least one stakeholder. The methods may include the actions of providing a list of crises assigned to a user, each crisis associated with a distinct collaboration space. Each distinct collaboration space may be associated with a distinct plurality of users.

Particular embodiments of the subject matter described in this specification can be implemented so as to realize one or more of the following advantages. Crises may be more effectively managed. Team members may have access to view multiple crisis situations at macro level. Team members can communicate using secure communication channels. Team members can quickly access pre-developed and approved strategies and messaging. Team members have access to single source of facts and action plans. Team members have ability to access historical record of events, actions, and communications. Team members can receive up to date communications. Team members can quickly collaborate and make decisions using the plurality of devices.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
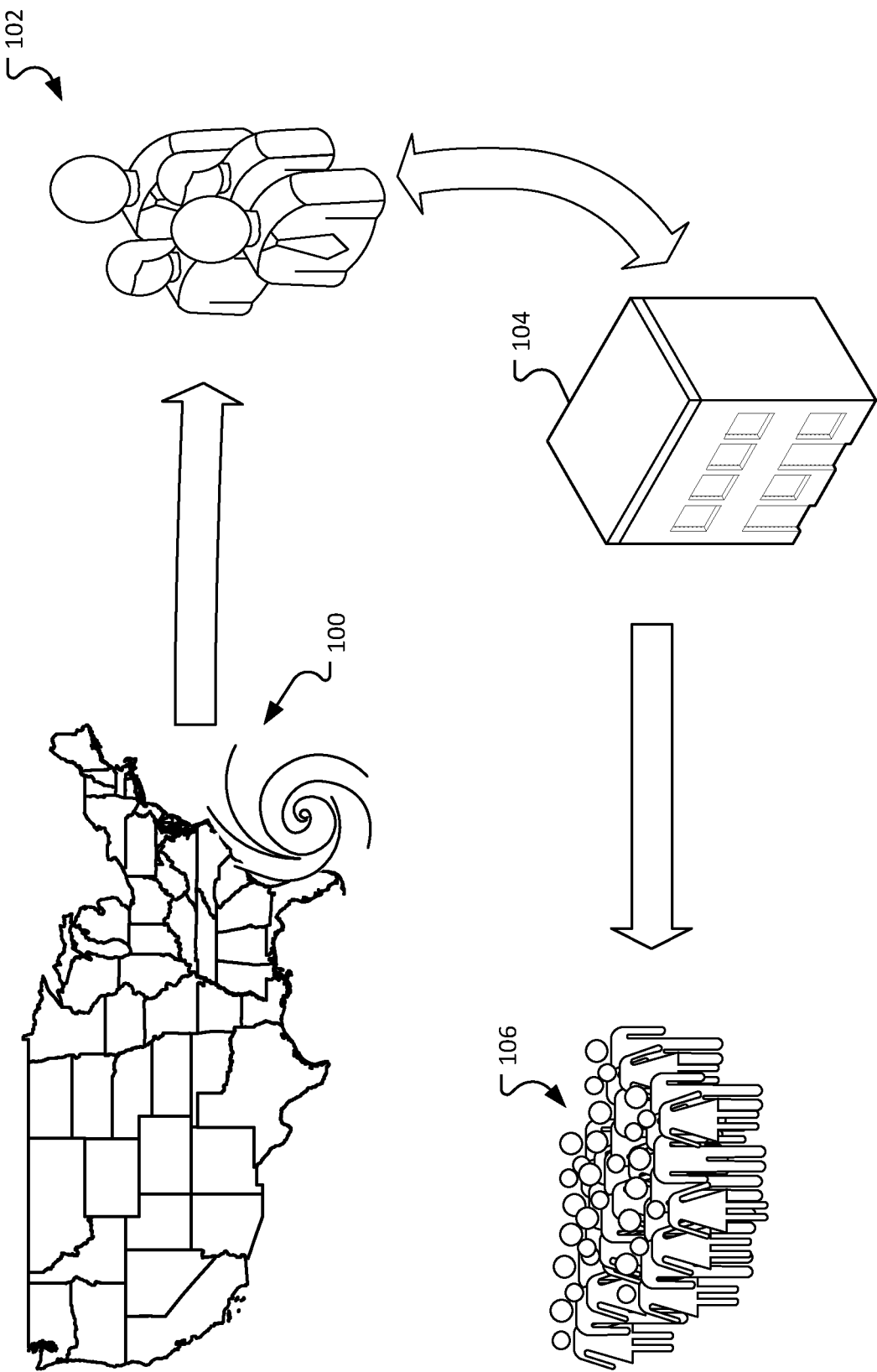
FIG. 1 illustrates an example of a crisis response within an organization.

News travels very quickly. A news story can break on the Internet and become widely known in minutes or hours. As a consequence, an organization needs to be able to respond to a crisis in increasingly shorter periods of time. FIG. 1 illustrates an example of a crisis response within an organization. In response to a crisis 100, for example, a hurricane off the Florida coast, an organization 104 may assign a group 102 of individuals (for example, employees, contractors, a public relations firm, etc.) to oversee the crisis management process. The group 102 gathers and coordinates the flow of information about the crisis and the internal workings of the organization 104. The group 102 may assist in preparing the organization 104 to respond to the crisis, for example, by staffing additional customer service representatives. The group 102 may also assist in determining when, how and which messages should be provided to the general public 106.

An application on a mobile device can provide secure mobile access to crisis response materials. The application can allow for tracking of multiple crises simultaneously, each in their own collaboration space. The application can allow for team members to be added to collaboration spaces, which in turn, enables flexibility of team to grow or change in the event that a situation escalates in severity. As team members are added, they have access to the historical facts, actions and communications. Team members have the ability to switch between electronic and mobile devices seamlessly. The application can allow for copy and pasting of messaging from documents to a collaboration space and from collaboration space to secure email system or other secure digital platforms.

Figure 2:
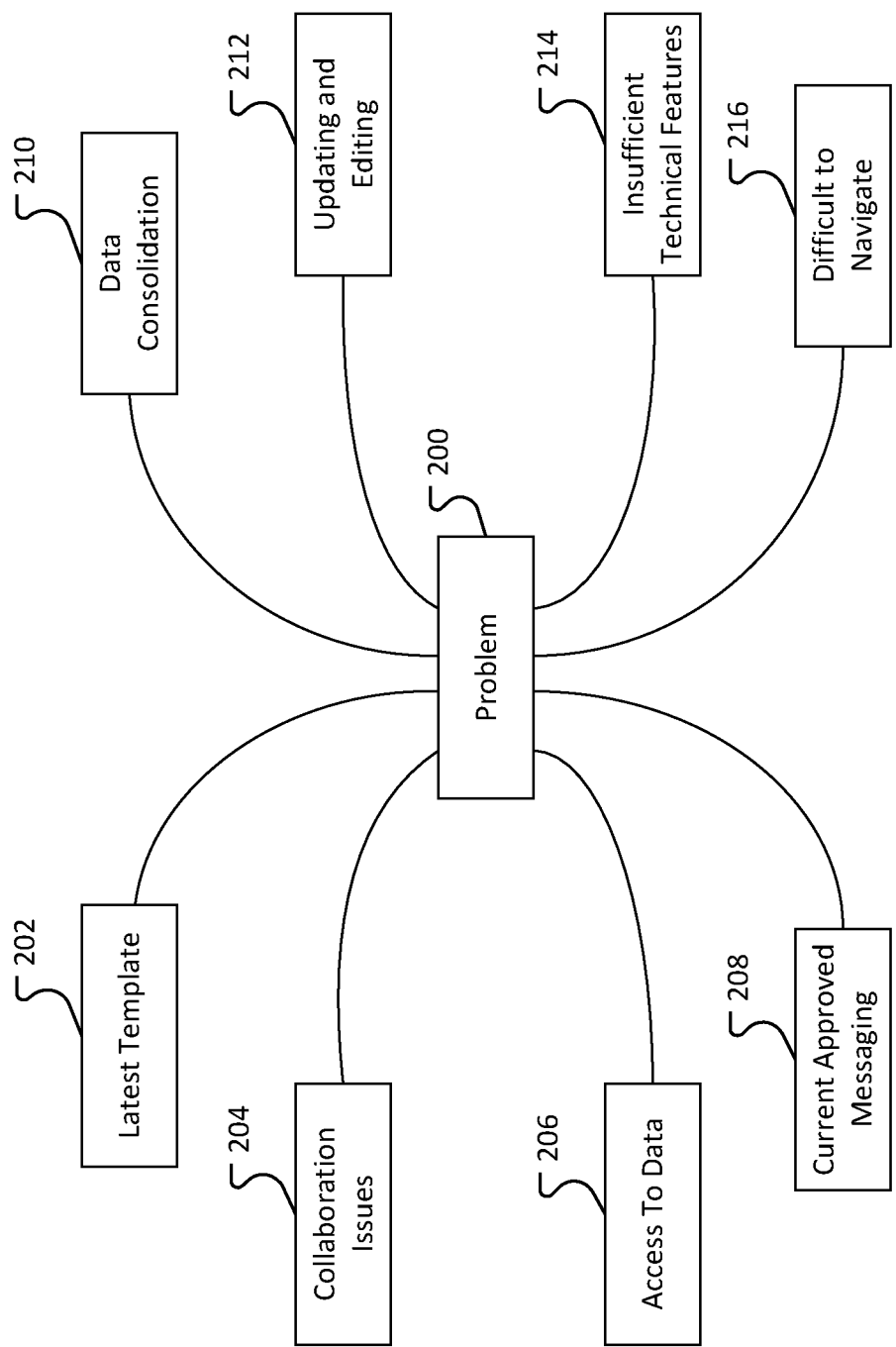
FIG. 2 illustrates common problems with responding to a crisis.

FIG. 2 illustrates common problems 200 with responding to a crisis. One problem is identifying and accessing current templates and documents 202. An organization may put together sample communication emails, issue templates, questions that need to be asked in response to various crises, and other standards documentation that needs to be accessible by team members responding to a crisis.

Team members also need to be able to collaborate 204. Crises do not necessarily occur during regular working hours. Members of a crisis response team need to be accessible and able to securely communicate with each other and key stakeholders at all times from various locations. Further, team members need to be able to update and edit documents 212 related to the crisis situation.

A crisis communication system can include several different features that aid in collaboration. In general, collaboration can refer to several different functions. For example, collaboration can refer to communication tools that allow the exchange information between individuals. Examples of communication tools include voicemail, e-mail, instant messages, video chat, chat, blogs, text, etc. Collaboration can also refer to coordination tools. Coordination tools enable team members to set up activities, schedules, and deliverables. These tools may include online calendars, time trackers, and spreadsheets. The collaboration tools may also enable video conferencing, instant message teleconferencing, and shared whiteboards.

The team members need to be able to access data 206 relevant to the crisis. Some of the relevant data may be available from public sources but other relevant data may be protected or otherwise secured. Team members may need to be able to access data during the crisis that they would not otherwise be authorized to access. Related to access to data 206, data may need to be consolidated 210 from multiple different data sources. For example, the team members may need to be able to access integrated data from new sources and internal departments.

Team members need a mechanism whereby messaging (internal and external communications) 208 can be approved by authorized individuals. Team members need a mechanism whereby messaging (internal and external communications) can be distributed and shared by individuals who are authorized to communicate on behalf of the organization.

Current approaches to supporting the team work necessary for an organization to respond to a crisis lack the technical features 214 to support the above described issues. Where systems exist they tend to be clunky and difficult to navigate 216. Functionality of current mobile capabilities requires a much smoother and much more robust navigational system.

Figure 3:
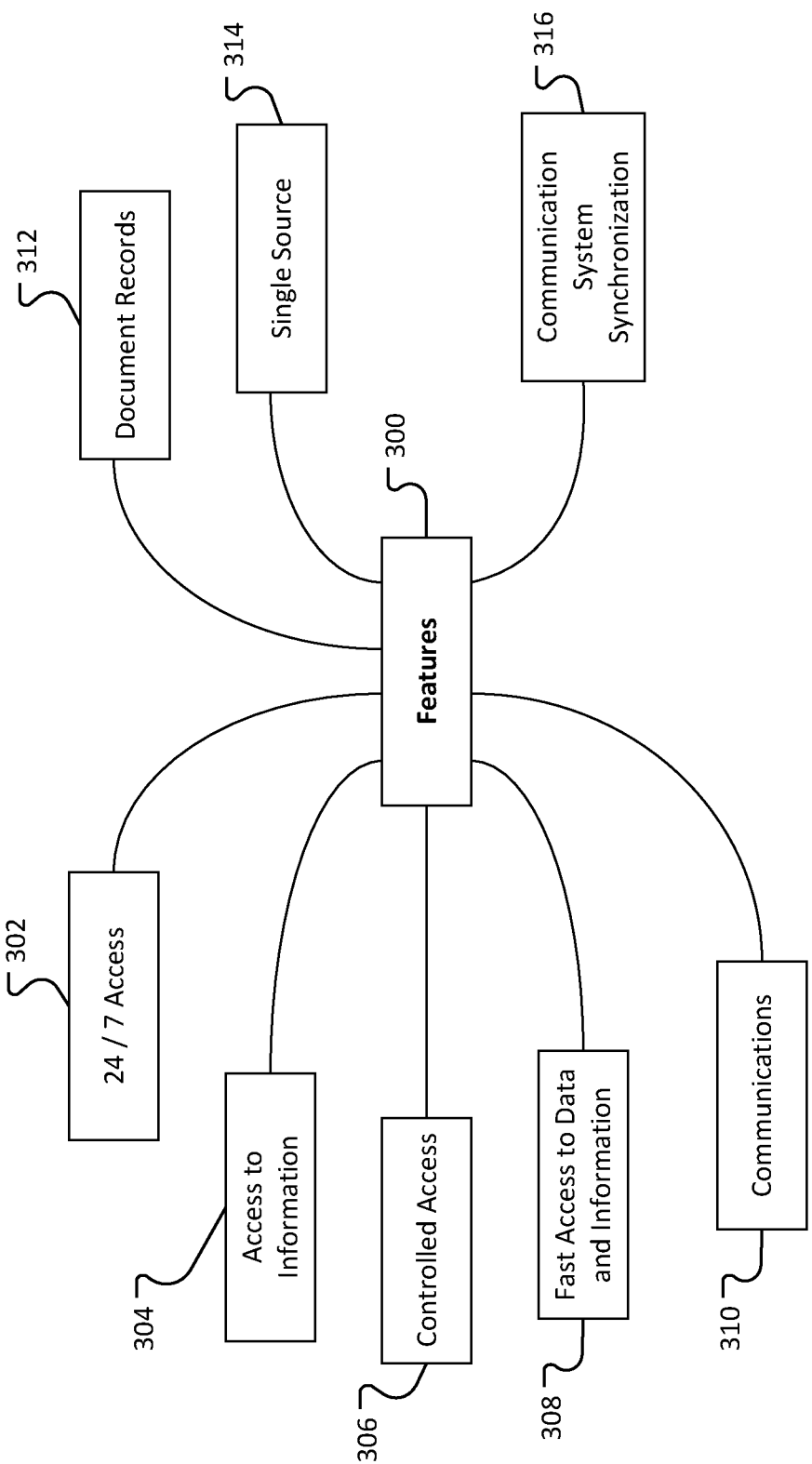
FIG. 3 illustrates some features that are advantageous to a crisis communications management system in order to address the problems described above.

FIG. 3 illustrates some features 300 that are advantageous to a crisis communications management system in order to address the problems described above. The system can be made available for use 24 hours a day, 7 days a week 302. Information can be accessible 304 from a plurality of devices, including mobile devices. Access to the information can be controlled 306 while allowing fast access to data and information 308. The information may be secured using encryption protocols, such as private key/public key encryption. One of the advantages to the crisis communications management system is that information may be freely shared among team members without exposing the information to individuals who are not authorized to view the information.

The system can support different communication channels 310 including, for example, the hypertext transport protocol (HTTP) transmitted over an IP network including IP networks established over cellular communication systems such as 4G and LTE systems, the system can utilize SMS messaging, and other communication protocols.

The system can provide a single source 314 of information about the crisis situation, including document records 312. The system can integrate with other communication systems 316. For example, the system can integrate with emergency preparedness systems such as Living Disaster Recovery Planning System (LDRPS) and Web EOC. In some implementations, the crisis communications management system may be the system of record for documents and information about the crisis. A system of record is a data store that is the authoritative data source for a given piece of information. In other implementations, the crisis communications management system may leverage information stored in a system of record to provide user friendly access to the data.

The system can provide status updates on the current state of the crisis, the status updates may be provided in the form of text messages, a blog, a summary/history of events, team discussions, and an integrated news feed.

Figure 4:
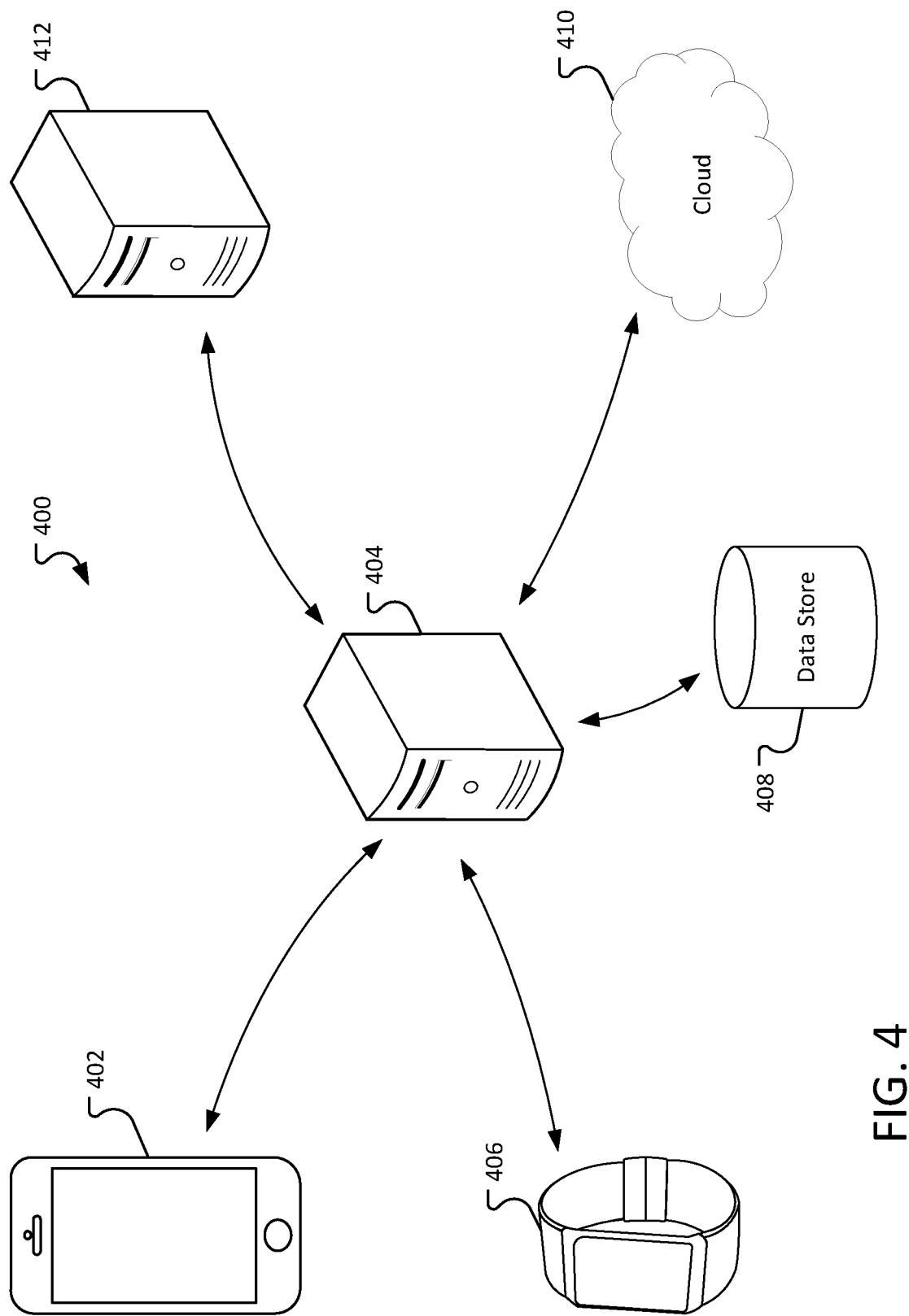
FIG. 4 illustrates an example environment for a crisis communications management system.

FIG. 4 illustrates an example environment 400 for a crisis communications management system 404. The crisis communications management system 404 can communicate with mobile devices, such as a smart phone 402 or a smart watch 406. Communication between the mobile devices in the crisis communications management system 404 can occur over the Internet using secure communication protocols, such as HTTPS. In some implementations, the mobile device may communicate with the crisis communications management system 404 using a virtual private network (VPN). In general, a VPN extends a private network across a public network, such as the Internet. The VPN enables users to transmit data across the public network as if their computing devices were directly connected to the private network. VPNs can be created by establishing a virtual point-to-point connection through the use of dedicated connections, virtual tunneling protocols, and/or traffic encryption.

The crisis communications management system 404 can push messages to the mobile devices. For example, an application on the mobile device may receive push communications informing a user associated with the mobile device that a crisis or an update to a crisis may have occurred.

Push notification, also called server push notification, is the delivery of information from a software application to the mobile device without a specific request from the client. Unlike pull notifications, in which the client must request information from a server, push notifications originate from a server. The user may be able to customize the delivery of the alerts, for example, they may request that alerts be sent to specific devices during different times of the day. There may be a threshold severity for an alert to be delivered. For example, an alert that is marked "emergency" may be delivered at any time, while an alert that is marked "information" may only be delivered during waking hours (for example, 8:00 AM to 10 PM). In some implementations, users may customize the time periods during which alerts of different severity can be delivered.

One advantage of push notifications in mobile computing is that the technology doesn't require specific applications on a mobile device to be open in order for a message to be received. This allows mobile to receive and display alerts even when the device is locked and the application is closed. In this way, the system 404 can ensure that an intended recipient of the message will be notified as soon as possible about the crisis situation.

The crisis communications management system 404 can connect to a data store 408. The data store 408 may be, for example, a relational database or a document management system. The data store 408 may include support information such as key questions to ask during the crisis, historic information, sample communications, data that supports collaboration spaces (discussed further below), and other related data.

The crisis communications management system 404 can integrate with other systems 412. These systems can include, for example, news feeds, crisis communications management systems, work flow systems, security systems, etc.

The crisis communications management system 404 may also integrate with cloud applications. Cloud applications can include software that is provided as a service (SaaS).

Figure 5:
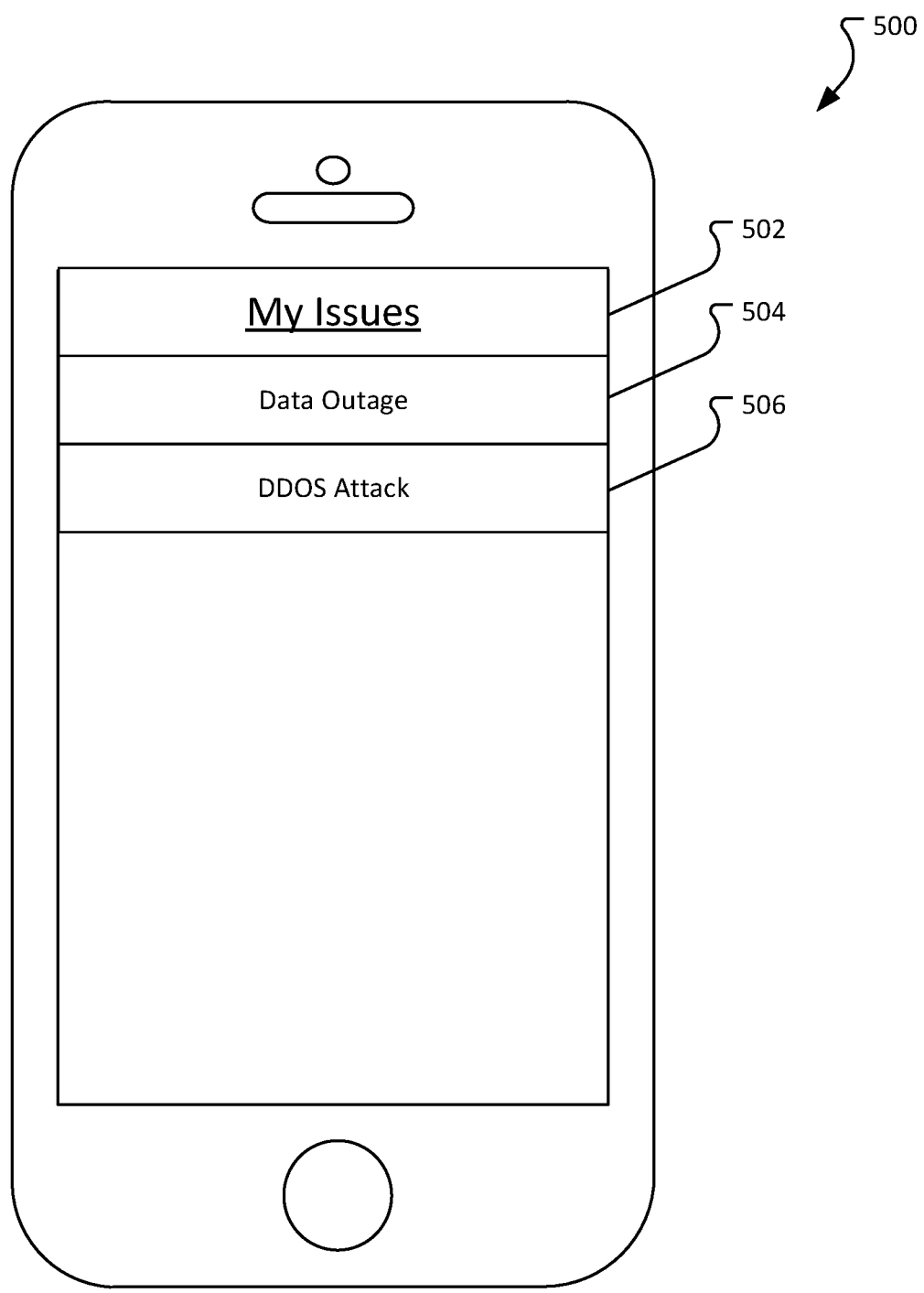
FIG. 5 is an example of a user interface provided to a mobile device for a crisis communications management system.

FIG. 5 is an example of a user interface 500 provided to a mobile device for a crisis communications management system. The user may be part of a team that is assigned to respond to crises that may occur. This user interface 500 displays the crises assigned to the user. In this example, the user is assigned to address a data outage 504 and a distributed denial of service (DDOS) attack 506. In some implementations, the screen that shows the crises to which the user is assigned may only be presented when the user has multiple assigned crises. For example, if the user were to have only a single crisis assigned, the system may take the user directly to the assigned crisis.

Figure 6:
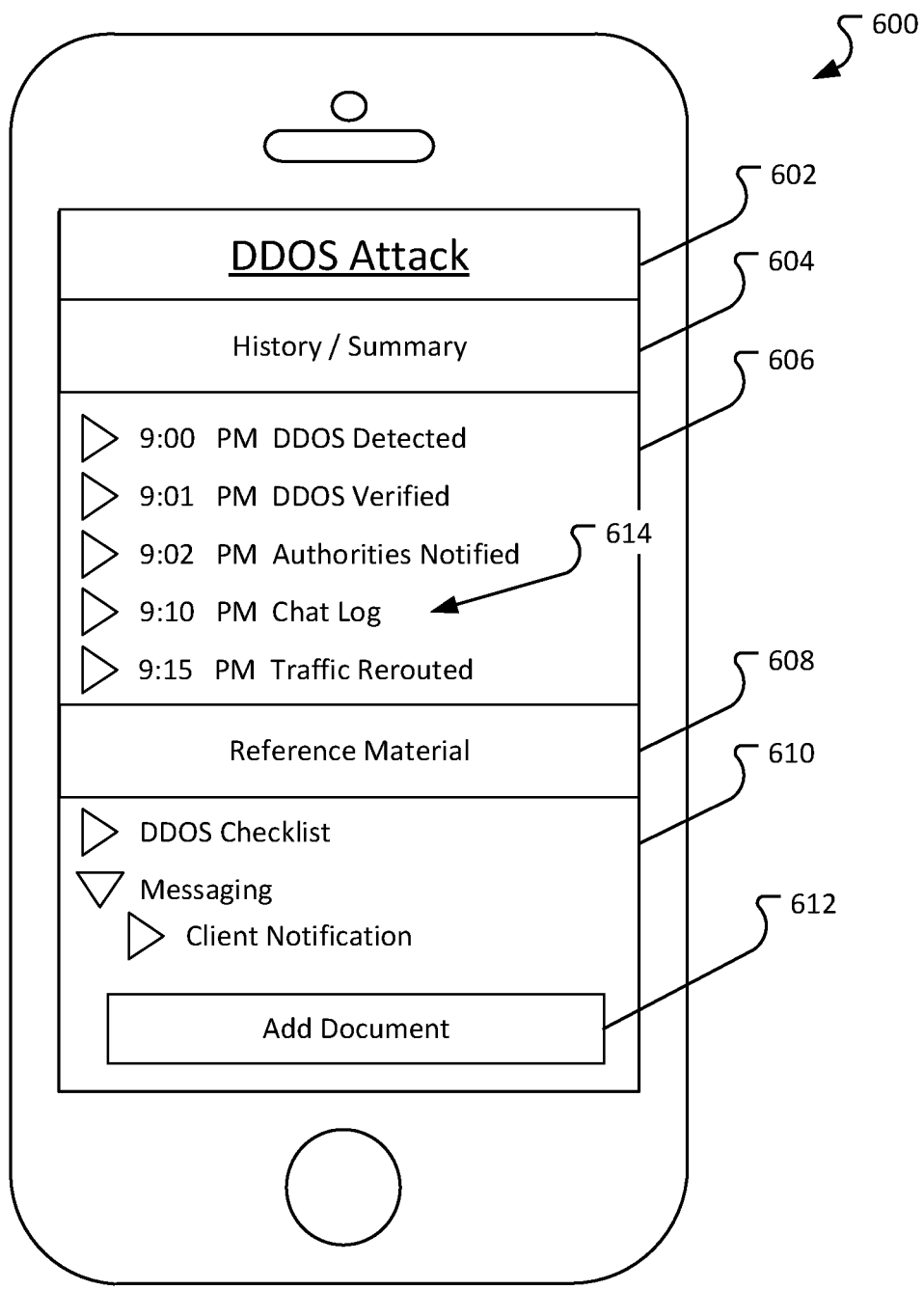
FIG. 6 illustrates an example of a user interface for providing information about a particular crisis.

FIG. 6 illustrates an example of a user interface 600 for providing information about a particular crisis. Once a user selects an assigned crisis, or once the system navigates the user to their sole assigned crisis, information about the crisis may be displayed.

Information about the crisis may include a history and/or summary of the crisis situation 604. The summary may include a timeline with information sufficient to enable a team member to rapidly learn the current state of the crisis. The summary may include a timeline 606 of different events that have occurred during the crisis. For example, the timeline 606 includes a list of different activities that have occurred from the time a DDOS attack was detected until the current time.

In some implementations, the history/summary 604 may include a transcript of discussions that occurred about the crisis. For example, the history/summary includes a chat log 614 of a discussion between team members (discussed in more detail with respect to FIG. 9, below).

The information about the crisis may also include reference material 608. The reference materials 610 can include checklists, pre-developed messaging, questions to ask, etc.

The user interface 600 may also allow the user to add new documents or entries into the history and/or summary 604. When a user adds a document or entry into the history and/or summary, the members of the team assigned to the crisis may receive push notifications about the change.

Figure 7:
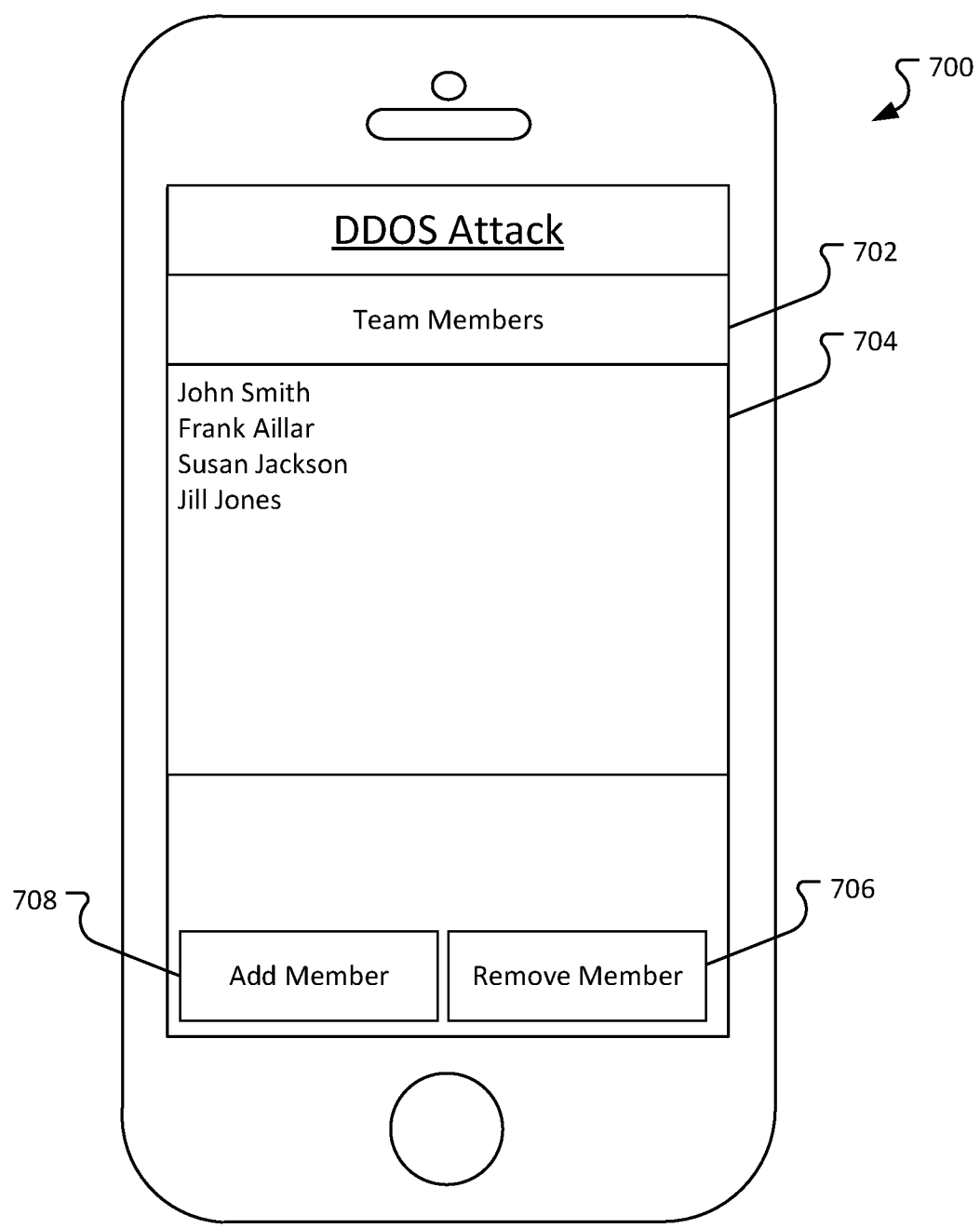
FIG. 7 illustrates an example of a user interface that displays team members assigned to a particular crisis.

FIG. 7 illustrates an example of a user interface 700 that displays team members assigned to a particular crisis. A team of individuals may be assigned to handle the communication and coordination during a particular crisis. The user interface 700 can display a list 702 of the current individuals 704 assigned to the crisis. The user interface 700 can also enable a user to add a member 708 or remove a member 706 from the list. In some implementations, only some individuals may be authorized to add or remove members from a team. In some implementations, teams including one or more members may be initially assigned to manage a crisis as a group. As the needs of the team evolve, members may be added or removed.

Figure 8:
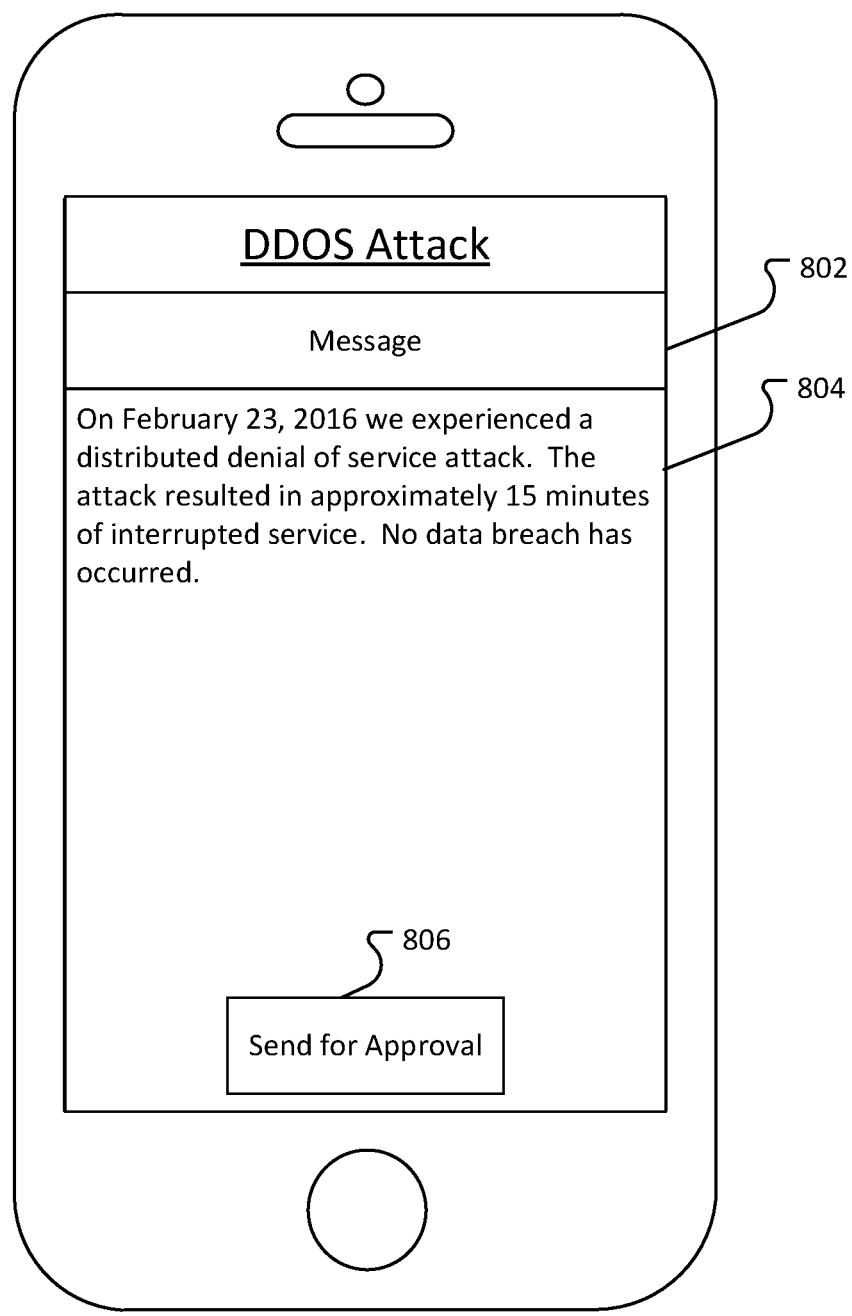
FIG. 8 illustrates an example of a user interface for preparing an outgoing communication.

FIG. 8 illustrates an example of a user interface 800 for preparing an outgoing communication 802. The communication can be based off of a set of predetermined, pre-crafted communications for various situations. For example, the crisis communications management system may have a set of pre-approved messages that can be used to communicate with various parties in the event of a crisis.

A user may have the ability to edit the text of the default message.

The user may also be able to send messaging for approval 806 to a third party. For example, messages to stakeholders may need to be approved by a manager or second crisis team member prior to delivery. The crisis communications management system may have a record of approved managers for particular types of crises or for a particular crisis. By selecting the "send for approval" button, the user sends the message 804 to the approver for acceptance.

Figure 9:
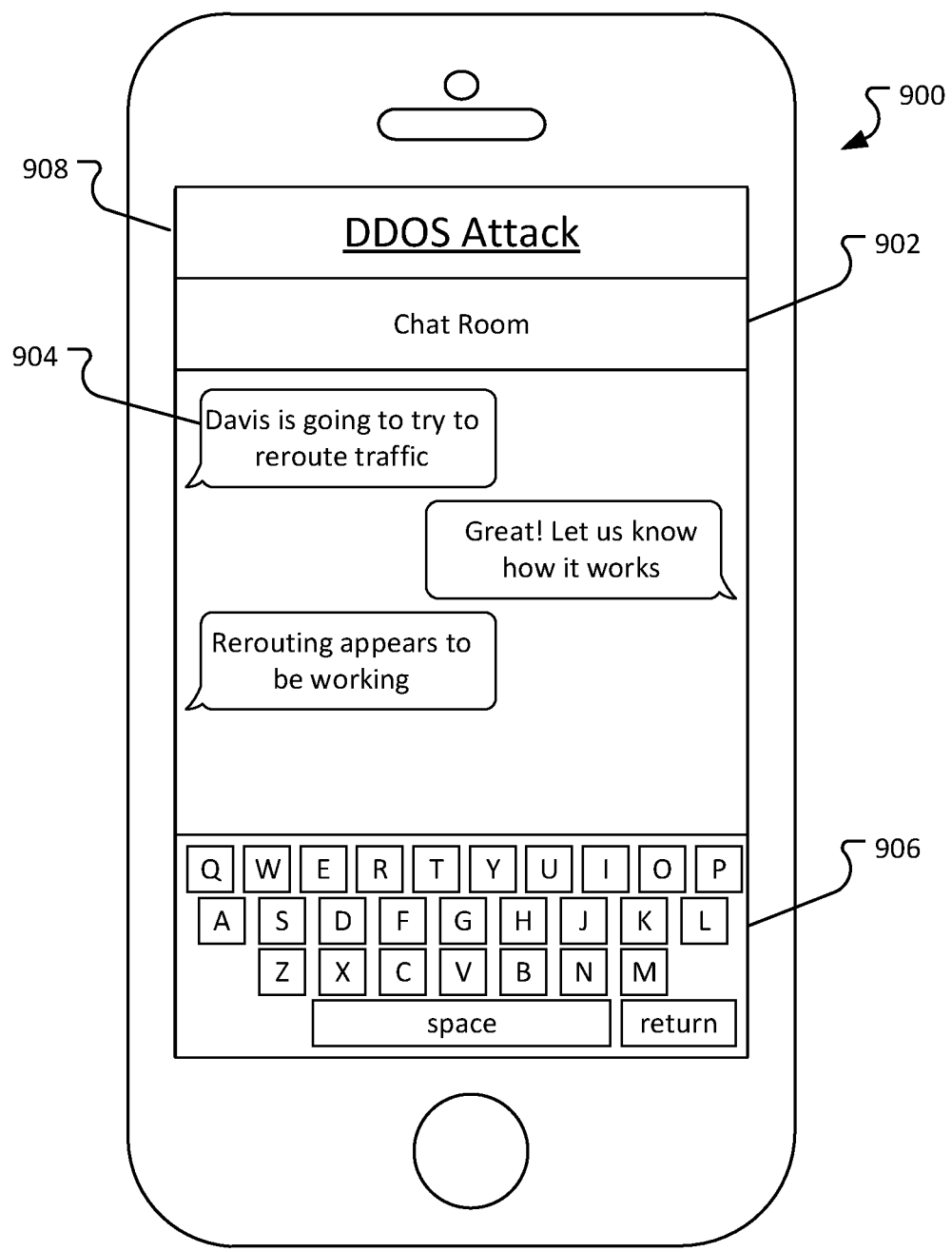
FIG. 9 illustrates an example of a chat collaboration function of the mobile device.

FIG. 9 illustrates an example of a chat collaboration function of the electronic and mobile devices. Each crisis may be associated with its own chat room, as shown by the title bar 908. In the chat room, team members can communicate asynchronously. In some implementations, each user may be identified in the chat, for example, the chat text 904 may be identified as having been sent by a particular team member, through a label and may also include color coding (not shown). Additionally, each chat text would contain date and time stamp. The user of the mobile device may enter communications using a conventional keyboard function 906 on the electronic or mobile device. The user of the mobile device may also enter communication using talk to text capabilities.

Figure 10:
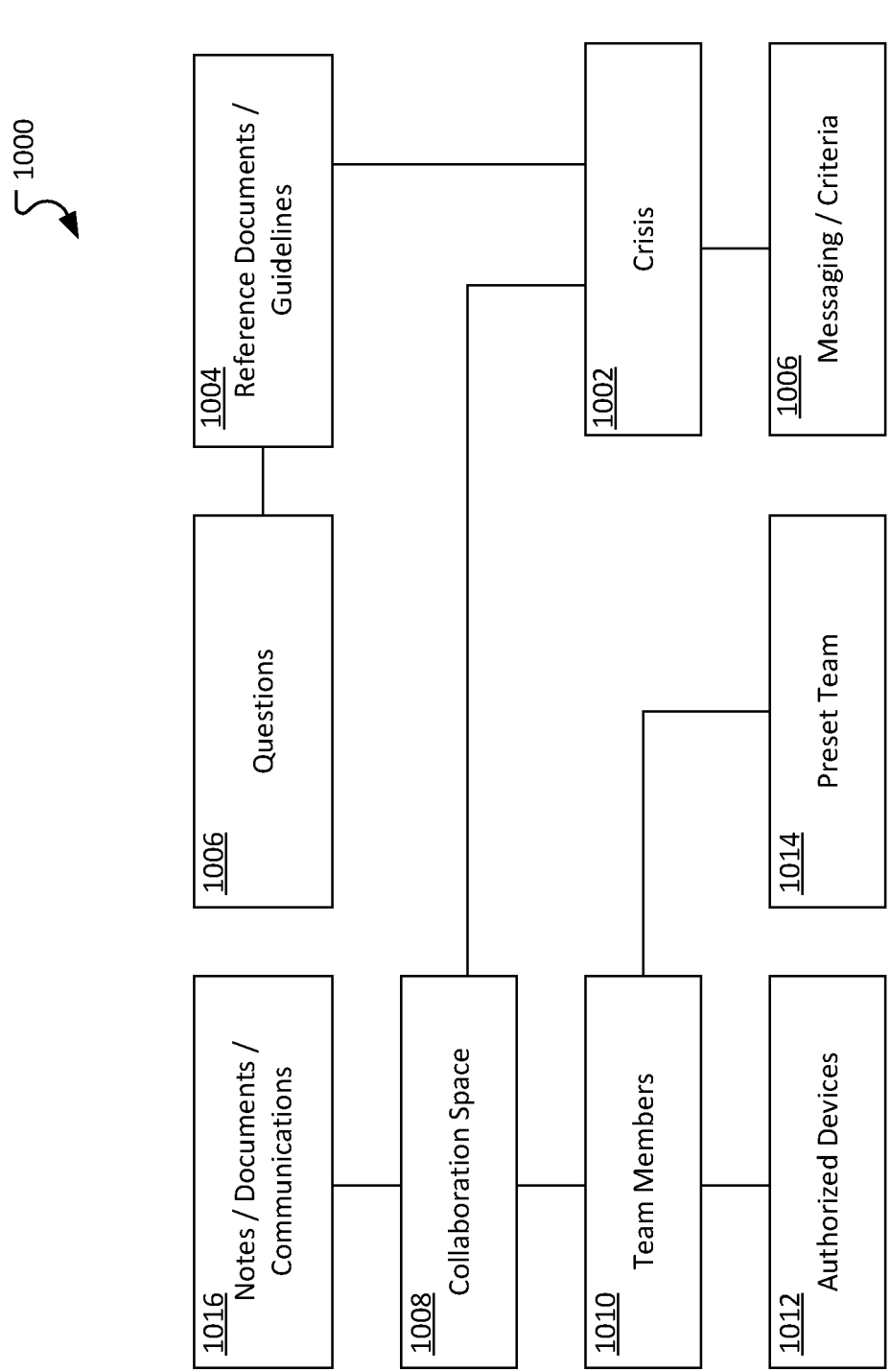
FIG. 10 illustrates an example of a data model to support a crisis communications management system.

FIG. 10 illustrates an example of a data model 1000 to support a crisis communications management system. A crisis 1002 refers to any event that requires the intervention or attention of a crisis management team. In some implementations, crises may be rated based on severity.

A crisis may be associated with a set of reference documents and guidelines 1004. The reference document and guidelines may be a collection of materials prepared in advance to describe how to triage and respond to the crisis. The materials may include, for example, best practices, warnings, and governmental or regulatory directives.

Included in the reference documents and guidelines may be messaging/criteria which could include questions 1006. The questions 1006 may be questions that should be answered by the crisis management team or subject matter experts in order to gain a more complete understanding of the crisis situation.

When a crisis 1002 is identified the crisis communications management system may create a collaboration space 1008. The collaboration space 1008 is a space for use by team members 1010 assigned to address the crisis situation.

Each member of the team may have one or more devices 1012 that are authorized to interact with the crisis communications management system.

In some implementations, individuals may be part of preset crisis communications management teams 1014. Teams may be set up before crises occur.

Working with the collaboration space 1008, members may create and collate notes, documents, and other communications 1016. Team members may be able to share pictures, e-mails, text messages, news feeds, and other information using the chat function.

Figure 11:
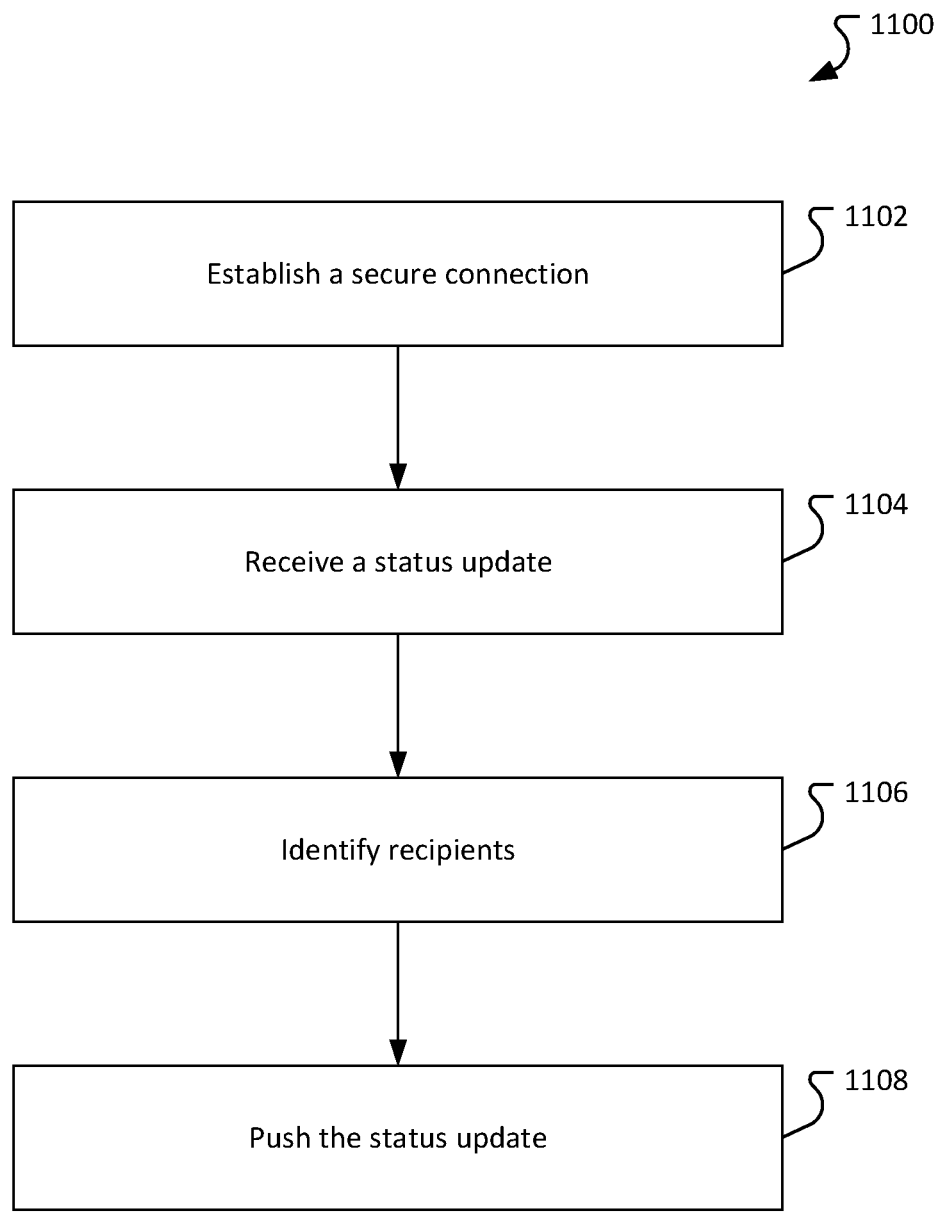
FIG. 11 is a flow chart of an example of a process used by a crisis communications management system.

FIG. 11 is a flow chart of an example of a process 1100 used by a crisis communications management system. The process may be performed by a crisis communications management system including a memory and processor capable of performing instructions provided on a non-transitory computer readable medium.

The process 1100 establishes 1102 a secure connection between a crisis communications management system and an electronic or mobile device. The connection may be secured using HTTPS, SSL, a VPN, encryption, or through other mechanisms.

The process 1100 receives 1104, over the secure connection, a status update about a crisis. For example, a user may enter a status update into the mobile device and send the update to the crisis communications management system.

The process 1100 identifies 1106 electronic or mobile devices associated with team members assigned to the crisis.

The process 1100 pushes 1108 the status update to each of the plurality of mobile devices. The process 1100 may use push notifications as described above.

Embodiments of the subject matter and the functional operations described in this specification can be implemented in digital electronic circuitry, tangibly-embodied computer software or firmware, computer hardware (including the structures disclosed in this specification and their structural equivalents), or in combinations of one or more of them. Embodiments of the subject matter described in this specification can be implemented as one or more computer programs (i.e., one or more modules of computer program instructions encoded on a tangible non-transitory program carrier for execution by, or to control the operation of data processing apparatus). The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example, a programmable processor, a computer, or multiple processors or computers. The apparatus can also be or further include special purpose logic circuitry (e.g., an FPGA (field programmable gate array) or an ASIC (application-specific integrated circuit)). In addition to hardware, the apparatus can optionally include code that creates an execution environment for computer programs (e.g., code that constitutes processor firmware, a protocol stack, a database management system, an operating system, or a combination of one or more of them).

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document, in a single file dedicated to the program in question, or in multiple coordinated files (e.g., files that store one or more modules, sub-programs, or portions of code)). A computer program can be deployed so that the program is executed on one computer or on multiple computers that are located at one site or distributed across multiple sites and interconnected by a data communication network. The processes and logic flows described in this specification can be performed by one or more programmable computers executing one or more computer programs to perform functions by operating on input data and generating output. The processes and logic flows can also be performed by, and apparatus can also be implemented as, special purpose logic circuitry (e.g., an FPGA (field programmable gate array) or an ASIC (application-specific integrated circuit)).

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks), however, a computer need not have such devices. Moreover, a computer can be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), to name just a few).

Computer-readable media suitable for storing computer program instructions and data include all forms of non-volatile non-transitory memory on media and memory devices, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback) and input from the user can be received in any form, including acoustic, speech, or tactile input. In addition, a computer can interact with a user by sending documents to and receiving documents from a device that is used by the user, for example, by sending web pages to a web browser on a user's device in response to requests received from the web browser.

Embodiments of the subject matter described in this specification can be implemented in a computing system that includes a back-end component (e.g., as a data server), or that includes a middleware component (e.g., an application server), or that includes a front-end component (e.g., a client computer having a graphical user interface or a web browser through which a user can interact with an implementation of the subject matter described in this specification), or any combination of one or more such back-end, middleware, or front-end components. The components of the system can be interconnected by any form or medium of digital data communication (e.g., a communication network). Examples of communication networks include a local area network (LAN) and a wide area network (WAN) (e.g., the Internet).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device (e.g., for purposes of displaying data to and receiving user input from a user interacting with the user device), which acts as a client. Data generated at the user device (e.g., a result of the user interaction) can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can, in some cases, be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    establishing, by a crisis communications management system, a secure connection between the crisis communications management system and each mobile device in a plurality of mobile devices;
    causing, by the crisis communications management system, a display device of a first mobile device of the plurality of mobile devices to render a user interface comprising one or more user-selectable icons, each of the user-selectable icons corresponding to a different respective crisis situation;
    causing, in response to receiving selection data indicating that a user of the first mobile device selected a user-selectable icon of the one or more user-selectable icons, the user interface to display information about the crisis situation corresponding to the selected user-selectable icon;
    receiving, by the crisis communications management system over the secure connection, data representing an update about the crisis situation corresponding to the selected user-selectable icon, the data being received from the first mobile device through the user interface;
    identifying, by the crisis communications management system, at least one second mobile device of the plurality of mobile devices, the at least one second mobile device associated with a team member assigned to the crisis situation corresponding to the selected user-selectable icon; and
    transmitting, by the crisis communications management system and over the secure connection, a push notification to an application on the identified at least one second mobile device which, when received by the application, causes the application to display, on a display device of the at least one second mobile device, the update about the crisis situation corresponding to the selected user-selectable icon.

2. The computer-implemented method of claim 1, further comprising:
    establishing a chat session between at least two mobile devices in the plurality of mobile devices.

3. The computer-implemented method of claim 1, further comprising:
    receiving news about the crisis situation from a news aggregation system; and
    forwarding the news to the identified at least one second mobile device.

4. The computer-implemented method of claim 1, wherein the crisis communications management system enables communication between team members and at least one stakeholder.

5. The computer-implemented method of claim 1, wherein each of the user-selectable icons correspond to a crisis situation assigned to the user of the first mobile device.

6. The computer-implemented method of claim 1, wherein each of the user-selectable icons correspond to a distinct collaboration space that is associated with a distinct plurality of users.

7. A non-transitory computer storage medium encoded with computer program instructions that when executed by one or more computers of a crisis communications management system cause the one or more computers to perform operations comprising:

establishing a secure connection between the crisis communications management system and each mobile device in a plurality of mobile devices;

causing a display device of a first mobile device of the plurality of mobile devices to render a user interface comprising one or more user-selectable icons, each of the user-selectable icons corresponding to a different respective crisis situation;

causing, in response to receiving selection data indicating that a user of the first mobile device selected a user-selectable icon of the one or more user-selectable icons, the user interface to display information about the crisis situation corresponding to the selected user-selectable icon;

receiving, over the secure connection, data representing an update about the crisis situation corresponding to the selected user-selectable icon, the data being received from the first mobile device through the user interface;

identifying at least one second mobile device of the plurality of mobile devices, the at least one second mobile device associated with a team member assigned to the crisis situation corresponding to the selected user-selectable icon; and transmitting, over the secure connection, a push notification to an application on the identified at least one second mobile device which, when received by the application, causes the application to display, on a display device of the at least one second mobile device, the update about the crisis situation corresponding to the selected user-selectable icon.

8. The non-transitory computer storage medium of claim 7, wherein the instructions are further operable to cause the one or more computers to perform operations comprising:
establishing a chat session between at least two mobile devices in the plurality of mobile devices.

9. The non-transitory computer storage medium of claim 7, wherein the instructions are further operable to cause the one or more computers to perform operations comprising:
receiving news about the crisis situation from a news aggregation system; and
forwarding the news to the identified at least one second mobile device.

10. The non-transitory computer storage medium of claim 7, wherein the crisis communications management system enables communication between team members and at least one stakeholder.

11. The non-transitory computer storage medium of claim 7, wherein each of the user-selectable icons correspond to a crisis situation assigned to the user of the first mobile device.

12. The non-transitory computer storage medium of claim 7, wherein each of the user-selectable icons correspond to a distinct collaboration space that is associated with a distinct plurality of users.

13. A system comprising:
one or more computers of a crisis communications management system and one or more storage devices storing instructions that are operable, when executed by the one or more computers, to cause the one or more computers to perform operations comprising:

establishing a secure connection between the crisis communications management system and each mobile device in a plurality of mobile devices;

causing a display device of a first mobile device of the plurality of mobile devices to render a user interface comprising one or more user-selectable icons, each of the user-selectable icons corresponding to a different respective crisis situation;

causing, in response to receiving selection data indicating that a user of the first mobile device selected a user-selectable icon of the one or more user-selectable icons, the user interface to display information about the crisis situation corresponding to the selected user-selectable icon;

receiving, over the secure connection, data representing an update about the crisis situation corresponding to the selected user-selectable icon, the data being received from the first mobile device through the user interface;

identifying at least one second mobile device of the plurality of mobile devices, the at least one second mobile device associated with a team member assigned to the crisis situation corresponding to the selected user-selectable icon; and transmitting, over the secure connection, a push notification to an application on the identified at least one second mobile device which, when received by the application, causes the application to display, on a display device of the at least one second mobile device, the update about the crisis situation corresponding to the selected user-selectable icon.

14. The system of claim 13, wherein the instructions are further operable to cause the cause the one or more computers to perform operations comprising:
establishing a chat session between at least two mobile devices in the plurality of mobile devices.

15. The system of claim 13, wherein the instructions are further operable to cause the one or more computers to perform operations comprising:
receiving news about the crisis situation from a news aggregation system; and
forwarding the news to the identified at least one second mobile device.

16. The system of claim 13, wherein the crisis communications management system enables communication between team members and at least one stakeholder.

17. The system of claim 13, wherein each of the user-selectable icons correspond to a crisis situation assigned to the user of the first mobile device.

18. The system of claim 13, wherein each of the user-selectable icons correspond to a distinct collaboration space that is associated with a distinct plurality of users.

* * * * *

UNITED STATES PATENT AND TRADEMARK OFFICE
CERTIFICATE OF CORRECTION

Page 1 of 1

PATENT NO. : 11,057,755 B1
APPLICATION NO. : 15/616652
DATED : July 6, 2021
INVENTOR(S) : Cynthia Harvey et al.

It is certified that error appears in the above-identified patent and that said Letters Patent is hereby corrected as shown below:

In the Claims

Column 12, Line 35, Claim 14, delete "cause the cause the" and insert -- cause the --, therefore.

Signed and Sealed this
Ninth Day of November, 2021

Drew Hirshfeld
*Performing the Functions and Duties of the*
*Under Secretary of Commerce for Intellectual Property and*
*Director of the United States Patent and Trademark Office*